Sept. 18, 1962   A. R. PEARLMAN   3,054,960
STATISTICAL DISTRIBUTION DEVICE
Filed May 13, 1959
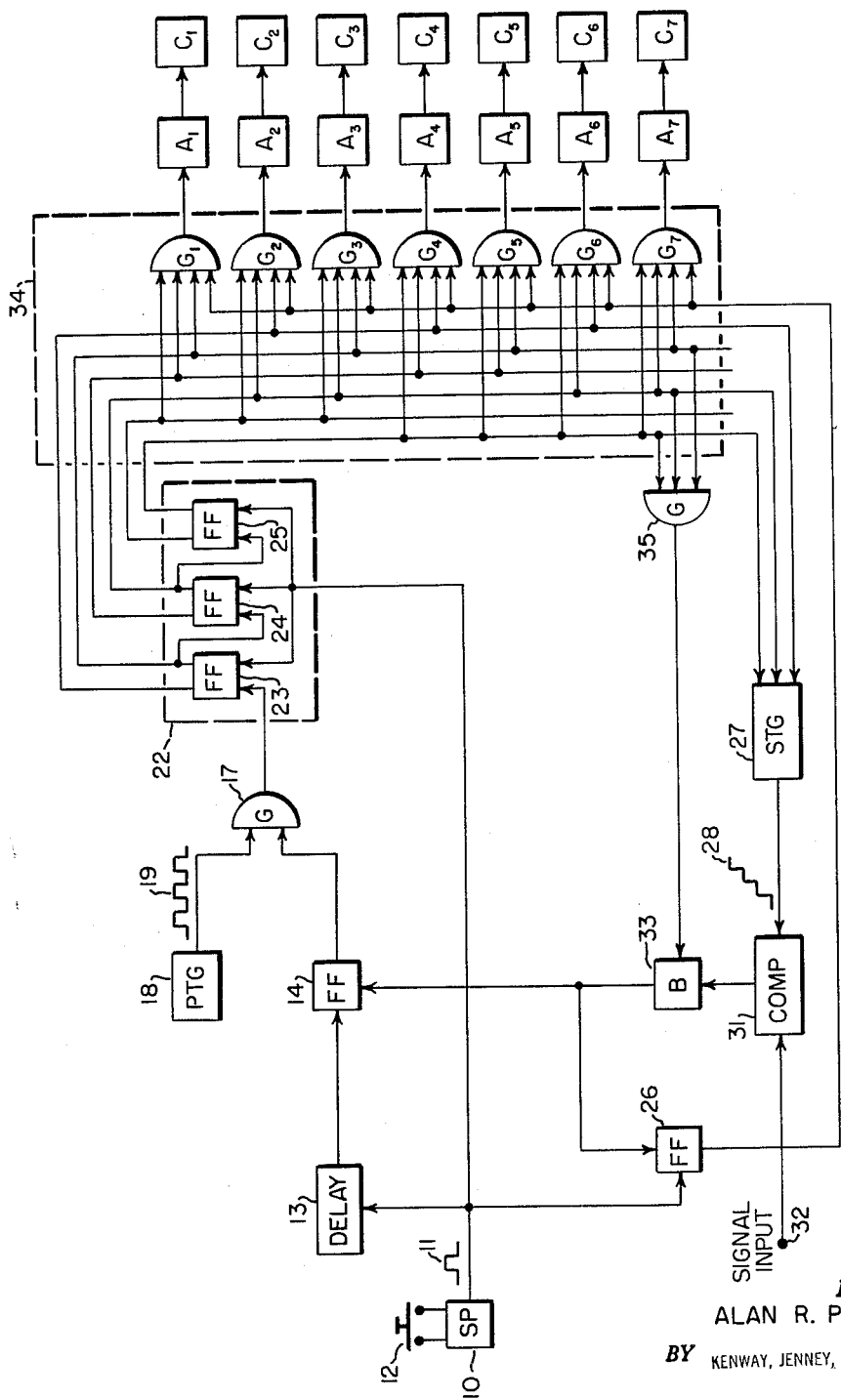
INVENTOR.
ALAN R. PEARLMAN
BY KENWAY, JENNEY, WITTER & HILDRETH
ATTORNEYS

United States Patent Office 3,054,960
Patented Sept. 18, 1962

3,054,960
STATISTICAL DISTRIBUTION DEVICE
Alan R. Pearlman, Watertown, Mass., assignor to Clevite Corporation, Cleveland, Ohio, a corporation of Ohio
Filed May 13, 1959, Ser. No. 812,891
4 Claims. (Cl. 328—116)

The present invention relates in general to apparatus for classifying unknown quantities by predetermined class intervals and specifically to a statistical distribution device wherein the unknown quantities are sorted by predetermined class intervals and a measurement is provided of the number of times each class interval is chosen.

In a broad sense, the step intervals of a digital voltmeter, or of a similar digital measuring device, may be considered class intervals. The signal to be measured is then classified in that class interval which brackets the signal amplitude. Where a number of signals are to be measured, each representative of an unknown quantity, a successive classification of the quantities by class interval is accomplished. In order to obtain an indication of the statistical distribution of the unknown quantities by class intervals, i.e. the number of times each class interval has an unknown quantity classified therein, it has heretofore been necessary to transpose the successively occurring voltmeter readings onto tape or onto punched cards and to employ a computer or an equivalent sorting device in order to sort the successive voltmeter readings. This technique, due to the number of steps required, has proved to be cumbersome and inflexible. The amount of complex equipment required is excessively large, carrying with it the attendant problems of cost and reliability.

It is, therefore, a primary object of the present invention to simplify and reduce the amount of equipment and the operational steps heretofore required for statistical distribution recording.

This and other objects of the invention together with additional features and advantages thereof will become more apparent when read in connection with the following specification, the single FIGURE of which illustrates in schematic form a preferred embodiment of the invention.

As is illustrated at the left-hand side of the drawing, a single pulser 10 is utilized to initiate operation of the system. The single pulser is of conventional design and provides an output pulse 11 each time it is actuated. A simple contactor 12 is illustrated as providing actuation for the single pulser, but other actuating means such as a photocell might equally well be used.

Connected to the single pulser 10 is a delay unit 13 which may be a simple delay line or other more complex device for providing a new pulse a predetermined time after the pulse 11 is received. In any event, the output of the delay unit 13 is fed to a reset-set flip-flop circuit 14 which is of conventional design.

An "AND" gate 17 has as its input the output of the flip-flop 14 and that of a pulse train generator 18, the output pulses from which are legended 19. A binary counter 22 accepts the output of "AND" gate 17, and it may include circuitry such as series-connected binary flip-flops 23, 24 and 25 which are shown as examples of typical binary counting components. The flip-flop 23 is the component of the counter to which the output of "AND" gate 17 is connected. Each of the flip-flops 23, 24 and 25 is provided with a separate output connection.

The output of the single pulser 11 is fed not only indirectly to the binary counter 22 as described above, but also directly to second inputs of each of the flip-flops 23, 24 and 25 of the counter. Furthermore, pulses from the single pulser are also fed directly to still another independent reset-set flip-flop 26.

A staircase generator 27 is connected to and derives its input signal from one of the two outputs of each of flip-flops 23, 24 and 25. The generator 27 is of well-known design and provides an output signal 28 of the step increment type.

A comparator 31 which may be any of several types of known discriminator circuits accepts the output of the staircase generator 27 and also the input signal which is to be classified from an input jack 32. A buffer 33 is fed from the comparator and its output is applied to the flip-flop 26 and the flip-flop 14.

A binary decoder matrix 34 is connected to and receives the outputs of flip-flops 23, 24 and 25 of the binary counter 22. In the preferred embodiment illustrated, the decoder matrix comprises seven "AND" gates, $G_1$, $G_2$ . . . $G_7$, connected so that one and only one gate is energized, corresponding to the number indicated by the flip-flops of the binary counter 22. The output of the flip-flop 26 is connected as an additional input to each of gates $G_1$, $G_2$ . . . $G_7$, the outputs of those gates being connected to corresponding driver amplifiers $A_1$, $A_3$ . . . $A_7$, respectively. The driver amplifiers are respectively coupled to a set of corresponding electromechanical counters $C_1$, $C_2$ . . . $C_7$, each of which is representative of a predetermined class interval. The class intervals need not be of the same size, but by way of example, each counter may represent or indiacte a class interval such as those listed below:

| | |
|---|---|
| $C_1$ | 0–1 |
| $C_2$ | 1.1–2 |
| $C_3$ | 3.1–4 |
| $C_4$ | 4.1–5 |
| $C_6$ | 5.1–6 |
| $C_7$ | over 6 |

Finally, an "AND" gate 35 derives its input from the flip-flops 23, 24 and 25 in parallel with the various gates $G_1$ through $G_7$ and the staircase generator 27. The output of the "AND" gate 35 is coupled as an additional input to the buffer 33.

In operation, the initiating pulse 11 produced upon actuation of the single pulser 10 by the contactor 12 or by a photocell or similar device resets the flip-flops 23, 24 and 25 of the binary counter 22. The output signal of the binary counter 22 causes the staircase generator 27 to be reset to zero output. The initiating pulse 11 also resets the flip-flop 26 which, in turn, closes the gates $G_1$, $G_2$ . . . $G_7$ of the binary decoder matrix 34. The initiating pulse 11 is also applied to the delay unit 13 which has a delay period sufficient to permit undesirable transients to die down. At the end of the delay period, the delayed original pulse or a new pulse later in time initiated by it is applied to the flip-flop 14 and sets the latter. As a result, the gate 17 is enabled or opened and rendered conductive. The pulse train 19 from the pulse train generator 18 is then applied to the binary counter 22. The pulses of the pulse train operate the serially connected flip-flop circuits 23, 24 and 25 and cause them to assume successive states corresponding to the binary form of the number of pulses transmitted by the gate 17. Upon application of the output signals of the binary counter 22 to the staircase generator 27, they are converted to the staircase function signal 28, one step increase occurring in response to the passage of each pulse of the train 19 through the "AND" gate 17. Accordingly, each step increase corresponds to one unique condition of the binary flip-flops. The signal 28 is applied to the comparator 31 where it is compared to the input signal applied to the terminal 32, which is representative of an unknown quantity. The comparator is essentially a sensitive voltage or current discriminator having two stable output states corresponding to either one of two conditions:

(a) The input signal (multiplied by a pre-set scale factor) is greater than the amplitude of the signal 28; or
(b) The input signal (multiplied by a pre-set scale factor) is less than the amplitude of the signal 28.

When the signal 28 has advanced by step increments to a level sufficient to cause the comparator to change from condition (a) to condition (b), the output signal resulting from the shift in state of the comparator is applied to the flip-flop circuit 14 via the buffer 33. As a result, the flip-flop 14 is reset and the gate 17 is disabled or closed to prevent the passage of further pulses. The flip-flops 23, 24 and 25, and hence the staircase generator, remain in the same state for the remainder of the operation, until reset by the arrival of another initiating pulse. The comparator output signal also sets the flip-flop 26 via the buffer 33 which provides a read-in signal to enable or open the gates $G_1, G_2 \ldots G_7$. As previously mentioned, these gates are connected as a binary decoding matrix wherein one and only one gate is energized for each unique condition, i.e. for each binary number appearing in the binary counter 22. Also, each step increment of the output signal 28 of the staircase generator corresponds to one unique condition of the flip-flop circuits of the binary counter 22. Accordingly, each step increase of the signal 28 corresponds to one of the gates $G_1, G_2 \ldots G_7$ which is appropriately energized, and hence to the class interval which is represented by the corresponding counter coupled to the energized gate. Upon a change of state of the comparator, the energized gate is enabled or opened and the electromechanical counter connected thereto is actuated. The counter thus selected indicates and records the class interval wherein the input signal is classifiable. After the cycle is completed, a new input signal is applied corresponding to the next quantity which is to be classified, the new cycle being initiated by firing the single pulser 10. Successive cycles thus provide a record of the statistical distribution by class interval of the respective unknown quantities.

The gate 35 operates to prevent the system from recycling indefinitely if a quantity is measured whose proper class interval is higher than the class interval represented by counter $C_6$. Whenever the last step increase of the function signal 28 energizes the gate $G_7$, the gate 35 is enabled or opened and resets the flip-flop 14 via the buffer 33, regardless of whether or not the signal 28 exceeds the input signal applied to the terminal 32. As a result, the gate 17 is closed and no additional pulses can pass. If this is not done the binary counter flip-flops 23, 24 and 25 will recycle indefinitely since comparator 31 cannot act to disable the pulse train 19 via the intermediate system modules 33, 14 and 17, unless the quantity lies in a class interval within the range of the system. The flip-flop 26 is activated by the same signal derived from the gate 35 to provide a read-in signal which enables or opens the gates $G_1, G_2 \ldots G_7$ and, therefore, actuates the counter $C_7$ which is connected to the energized gate $G_7$. Thereafter, the operation can be resumed only upon the occurrence of a new initiating pulse. In order to classify such an unknown quantity as described above whose class interval is higher than that represented by the counter $C_6$, it is necessary to adjust the scale factor applied to the input signal in order to bring the latter within the range of the signal 28. The latter operation is conveniently carried out at the input of the comparator 31.

The binary counter may, of course, be expanded to any required size, the three flip-flops employed in the illustrated embodiment of the invention being merely one example. Similarly, any number of gates may be used in the binary decoding matrix according to the requirements of the situation. If desired, the output of the comparator can be gated with a sampling pulse and timed to occur a predetermined time interval after the step increase has taken place in order to allow for the recovery of the apparatus from transient effects.

Various applications of the invention are feasible. Thus, in one embodiment of the invention the step increase signal may be utilized as the stimulus for testing a component while the comparator compares the step function signal 28 with an internal reference, e.g. a diode peak-inverse voltage.

It will readily become apparent that numerous modifications of the invention described may be made by those skilled in the art, all of which fall with the purview of the invention. Consequently, the invention disclosed should be limited only by the spirit and scope of the appended claims.

What is claimed is:

1. Apparatus for providing a record of the statistical distribution of an input signal by class intervals of ascending order, comprising means for providing an initiating pulse, a first bistable circuit coupled to said initiating pulse means, pulse delay means adapted to receive said initiating pulse, a second bistable circuit connected to said pulse delay means, a pulse train generator, a first gate coupled to the output of said pulse train generator and of said second bistable circuit respectively, a plurailty of bistable circuits connected serially to form a binary counter, each of said serially connected bistable circuits being adapted to receive said initiating pulse, the first one of said serially connected bistable circuits being coupled to the output of said first gate, a staircase generator coupled to selected outputs of said serially connected bistable circuits, a comparator, means for coupling the output of said staircase generator to said comparator as a first input of the latter, means for applying said input signal as a second input of said comparator, to be compared against said first input, means for adjustably presetting a comparison scale factor, means for buffering the output of said comparator to said first and second bistable circuits respectively, a plurality of gates each corresponding to one of said class intervals, means for connecting said gates as a binary decoding matrix to the outputs of said serially connected bistable circuits, means for coupling the output of said first bistable circuit to each one of said plurality of gates, a feedback gate coupled to the output of said serially connected bistable circuits in parallel with the gate corresponding to the highest order class interval, means for buffering the output of said feedback gate to said first and second bistable circuits respectively, an amplifier coupled to each one of said plurality of gates, and a counter coupled to each of said amplifiers.

2. A statistical distribution recorder adapted to classify an input signal by class intervals of ascending order, comprising means for providing an initiating pulse, a first bistable circuit adapted to be reset by said initiating pulse, a second bistable circuit adapted to be set by said initiating pulse, means for providing a train of pulses, a first gating circuit connected to receive said pulse train, said gating circuit being adapted to be enabled by output signals derived from said second bistable circuit in its set state, a binary counter adapted to count the number of pulses of said pulse train, means for enabling said counter with said initiating pulse, a staircase generator adapted to provide step increment signals corresponding to the output of said binary counter, a comparator adapted to compare said input signal with the output signal of said staircase generator, means responsive to the output signal of said comparator for resetting said second bistable circuit, a decoding matrix coupled to said binary counter, means responsive to said comparator output signal to enable said decoding matrix by setting said first bistable circuit, a plurality of counters each corresponding to one of said class intervals, said diode matrix being adapted to actuate said counters selectively in response to output signals derived from said binary counters and simultaneously with an enabling signal derived from said first bistable circuit.

3. The apparatus of claim 2 and further comprising means for delaying said initiating pulse by a predetermined time interval prior to its application to said second bistable circuit, and means for enabling said comparator a predetermined time interval after the occurrence of each step increment of the staircase generator output signal.

4. A statistical distribution recorder adapted to assign each input signal to one of a predetermined number of class intervals, comprising means for providing an initiating pulse, a pulse train generator, a gating circuit, means responsive to said initiating pulse for enabling said gating circuit, a binary counter adapted to count the number of pulses in said pulse train, means responsive to said initiating pulse for enabling said counter, a staircase generator adapted to provide a step increase signal corresponding to the output signals of said binary counter, a comparator adapted to compare said step increase signal with said input signal, a decoder matrix coupled to said binary counter, said matrix being adapted to be enabled as a result of output signals derived from said comparator, recording means corresponding to each of said class intervals, said recording means being coupled to said decoder matrix for selective energization by the latter, each of said recording means being adapted to provide a record of the assignment of said input signal to the class interval corresponding thereto.

References Cited in the file of this patent

UNITED STATES PATENTS

| | | |
|---|---|---|
| 2,529,666 | Sands | Nov. 14, 1950 |
| 2,560,166 | Glenn | July 10, 1951 |
| 2,642,527 | Kelley | June 16, 1953 |
| 2,678,254 | Schenck | May 11, 1954 |
| 2,791,746 | Bowersox | May 7, 1957 |
| 2,796,314 | Bishop et al. | June 18, 1957 |
| 2,847,268 | Cowper | Aug. 12, 1958 |